UNITED STATES PATENT OFFICE.

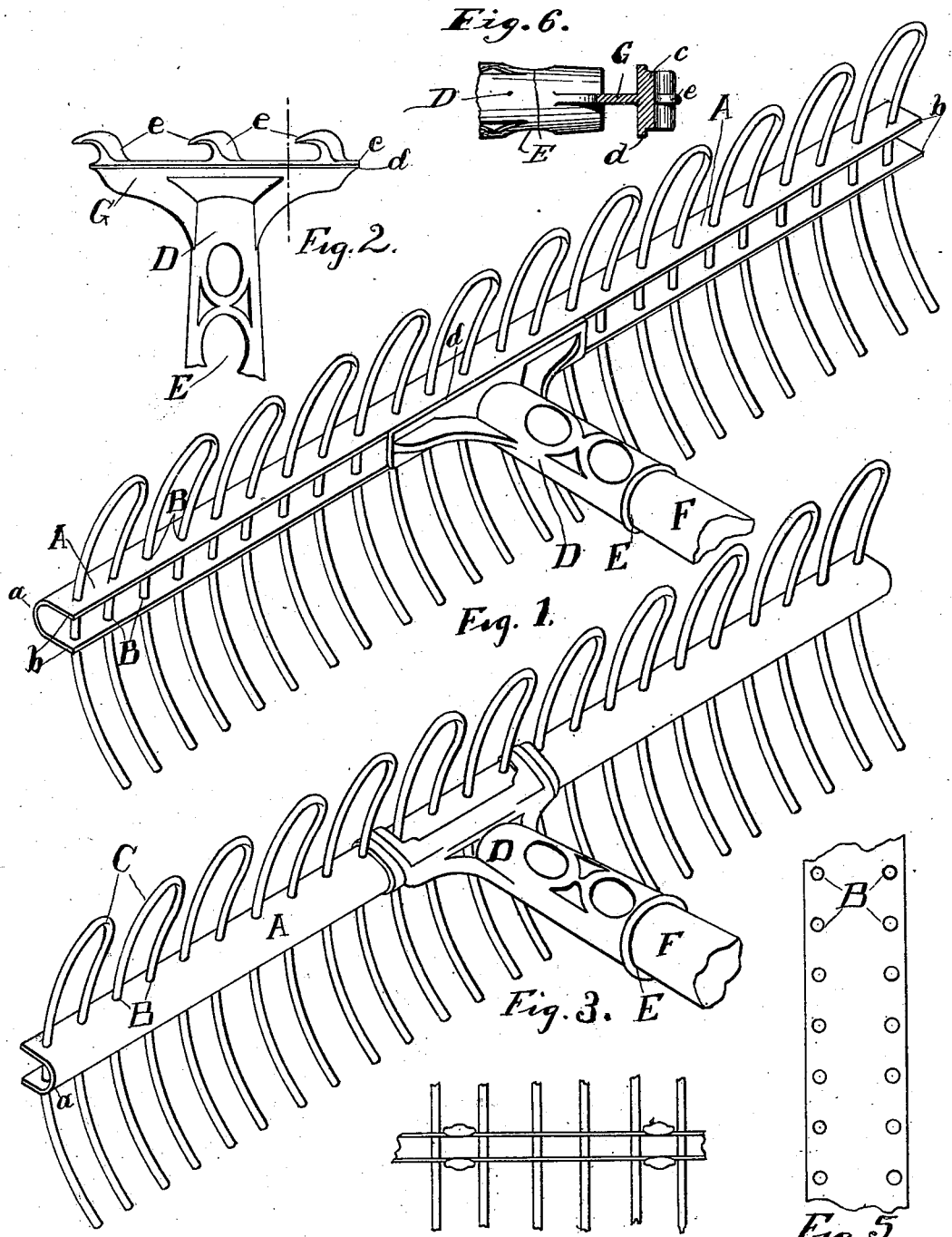

LEWIS GIBBS, OF CANTON, OHIO.

LAWN-RAKE.

SPECIFICATION forming part of Letters Patent No. 514,989, dated February 20, 1894.

Application filed September 19, 1893. Serial No. 485,744. (No model.)

*To all whom it may concern:*

Be it known that I, LEWIS GIBBS, a citizen of the United States, and a resident of Canton, county of Stark, State of Ohio, have invented a new and useful Improvement in Lawn-Rakes, of which the following is a full, clear, and exact description, reference being had to the accompanying drawings, making part of this specification.

My invention relates to an improvement in lawn rakes, the object of which is to provide a light, yet strong and durable rake at a reduced initial cost.

With these objects in view my invention consists of certain features of construction and combination of parts as hereinafter described and pointed out in the claims.

Figure 1, of the accompanying drawings is a view in perspective of a rake illustrating my invention; Fig. 2, a plan view of the handle socket. Fig. 3, is a perspective of the rake with the head reversed. Fig. 4, is a plan view of a central portion of Fig. 3, showing the manner of clinching the prongs of the handle to the head. Fig. 5, is a plan view of a fragment of the head before bending into the U. form. Fig. 6 is a vertical sectional view through the handle socket.

Referring to Fig. 1, A represents the rake head which may be made of any suitable sheet metal of suitable thickness, preferably of soft steel, rolled in ribbon form and of desired width. The metal so prepared is cut into desired lengths, after which a series of perforations B, are punched in the sides thereof, as shown in Fig. 5. The cut and punched head pieces are then rolled or turned into a U form in cross sections, the bottom portion $a$, circular, and the sides $b$ parallel, the perforations of one side to correspond with the perforations of the opposite side. The rake teeth C are formed substantially as shown, of wire adapted to the perforations B. The teeth may be curved longitudinally as shown either before or after they are put into the head. The webs of the head are held in parallel relation when the teeth are inserted, and the tendency of the webs to spring back or straighten causes the webs to firmly engage and lock the teeth in the head. A handle socket D is provided having a socket E to receive the end of the handle F, and a head portion G, having a shoulder portion $c$ to pass in between the sides $b$, a flanged portion $d$ to rest against the edges of the sides $b$. This head portion is also provided with hooks $e$, projected outwardly, and longitudinally with the head in one direction as shown. The hook $e$ is passed into U, formed by the bending of the plate, and between the teeth the head portion of the socket and the hooks are moved to one side, the hooks passing behind the teeth. The rake is then tinned by which operation the several parts are secured in position.

Fig. 3, represents simply another form of assembling the parts, and an adaptation of a handle socket in this figure is shown, the same head A, and teeth C, the position of the head and teeth transposed as shown.

Having thus fully described the nature and object of my invention, what I claim as new, and desire to secure by Letters Patent, is—

1. As an improved article of manufacture, a U shaped rake head, constructed of spring metal and formed with coincident tooth openings, whereby when the teeth are inserted in said openings they are automatically locked to the head by its spring action, substantially as set forth.

2. The combination with a rake head constructed in U form in cross-section, and of spring metal, and provided with coincident holes, of teeth inserted through said holes, when the webs of the head are compressed, whereby when the pressure is removed, from the head, the webs will distend, and thereby lock the teeth to the head, substantially as set forth.

3. The combination with a rake head, constructed of spring metal of U form in cross section, and provided with coinciding holes of U shaped teeth, inserted through said holes, and clamped in position by the resiliency of the metal, substantially as described and for the purpose set forth.

4. The combination with a rake head and its teeth, of a handle socket, having a head which is provided with laterally extending hooks engaging the teeth, said hooks, socket head, and rake head being tinned together, substantially as described and for the purpose set forth.

5. The combination with a rake head, and its teeth, said rake head being of U form in cross-section, of a handle socket, provided with a head having a central longitudinal shoulder to fit between the webs of the rake head, and support the same, said socket head being provided with hooks which engage the teeth, substantially as described and for the purpose set forth.

In testimony whereof I have hereunto set my hand this 14th day of September, A. D. 1893.

LEWIS GIBBS.

Witnesses:
W. K. MILLER,
BURT A. MILLER.